(12) United States Patent
Mishra et al.

(10) Patent No.: US 9,841,559 B2
(45) Date of Patent: Dec. 12, 2017

(54) MULTIMODE FIBER WITH INTERMEDIATE CLAD LAYER

(71) Applicant: Corning Incorporated, Corning, NY (US)

(72) Inventors: Snigdharaj Kumar Mishra, Wilmington, NC (US); Oleksandr Kogan, Wilmington, NC (US); Simit Mayank Patel, Wilmington, NC (US); Elios Klemo, Wilmington, NC (US); Daniel J Halvorson, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/429,421

(22) Filed: Feb. 10, 2017

(65) Prior Publication Data

US 2017/0242186 A1     Aug. 24, 2017

Related U.S. Application Data

(60) Provisional application No. 62/299,194, filed on Feb. 24, 2016.

(51) Int. Cl.
    *G02B 6/028*     (2006.01)
    *G02B 6/036*     (2006.01)
(52) U.S. Cl.
    CPC ....... *G02B 6/0288* (2013.01); *G02B 6/03638* (2013.01)

(58) Field of Classification Search
    CPC .................. G02B 6/0288; G02B 6/03638
    See application file for complete search history.

(56) References Cited

U.S. PATENT DOCUMENTS 5,841,933 A   11/1998   Hoaglin
7,646,955 B2   1/2010   Donlagic
              (Continued)

OTHER PUBLICATIONS

J.M. Arnold, "Asymptotic evaluation of the normalized cut-off frequencies of an optical waveguide with quadratic index variation", IEEE Microwaves, Optics and Acoustics, 1977, vol. 1, No. 6, p. 203-208.

*Primary Examiner* — Sung Pak
(74) *Attorney, Agent, or Firm* — Kevin L. Bray

(57) ABSTRACT

An optical fiber including a multimode core having a radius, $R_1$, and a maximum relative refractive index, $\Delta_{1MAX}$, at a wavelength $\lambda_0$, an inner clad layer surrounding the core and having a radial thickness, $T_2$, and a minimum relative refractive index, $\Delta_{2MIN}$, of about 0.0% at a wavelength of $\lambda_0$, an intermediate clad layer surrounding the inner clad layer and having a radial thickness, $T_3$, and a maximum relative refractive index $\Delta_{3MAX}$ and an outer clad layer surrounding the inner clad layer and having a radial thickness, $T_4$, and a maximum relative refractive index, $\Delta_{4MIN}$, at a wavelength of $\lambda_0$. The optical fiber satisfies the following relationship: $\Delta_{1MAX} > \Delta_{3MAX} > \Delta_{2MIN}$, and the optical fiber exhibits an overfilled bandwidth of greater than or equal to about 1.5 GHz-km at $\lambda_0$.

22 Claims, 7 Drawing Sheets

(56) References Cited

U.S. PATENT DOCUMENTS

| | | | |
|---|---|---|---|
| 8,385,702 B2 | 2/2013 | Bickham | |
| 8,406,592 B2 | 3/2013 | Abbott, III | |
| 9,360,619 B2 | 6/2016 | Bookbinder | |
| 9,405,062 B2 | 8/2016 | Krabshuis et al. | |
| 9,519,102 B2 * | 12/2016 | Bickham | G02B 6/0288 |
| 2009/0169163 A1 | 7/2009 | Abbott, III | |
| 2012/0230638 A1 | 9/2012 | Bickham | |
| 2012/0275751 A1 | 11/2012 | Krabshuis | |
| 2013/0322837 A1 * | 12/2013 | Bickham | G02B 6/0288 385/124 |
| 2015/0104140 A1 * | 4/2015 | Wang | G02B 6/03644 385/124 |
| 2015/0309250 A1 * | 10/2015 | Bickham | G02B 6/0288 385/124 |
| 2016/0313502 A1 | 10/2016 | Bickham | |
| 2017/0059773 A1 * | 3/2017 | Yonezawa | G02B 6/0288 |
| 2017/0068046 A1 * | 3/2017 | Bickham | G02B 6/0288 |

* cited by examiner

MULTIMODE FIBER WITH INTERMEDIATE CLAD LAYER

This application claims the benefit of priority under 35 U.S.C. §119 of U.S. Provisional Application Ser. No. 62/299,194 filed on Feb. 24, 2016 the content of which is relied upon and incorporated herein by reference in its entirety.

BACKGROUND

Field

The present disclosure relates generally to optical fibers, and particularly to bend insensitive optical fibers comprising an intermediate clad layer positioned between an inner clad layer and an outer clad layer.

Technical Background

Glass optical fibers with improved bend loss properties have recently been of significant interest in the telecommunications field. Techniques for improving fiber bending properties can play important roles in many types of fibers, including transmission fibers used in long distance, multimode fibers used in the emerging area of fiber to the home applications, and dispersion compensation fibers where bending loss has limited many designs from practical use. In certain applications such as fiber to the home applications, the ability to form a tight bending diameter is desired with negligible bending loss. Many of the proposed solutions for this problem involve significant modification of the fiber refractive index profile.

SUMMARY

An optical fiber including a multimode core having a radius, $R_1$, and a maximum relative refractive index, $\Delta_{1MAX}$, at a wavelength $\lambda_0$, an inner clad layer surrounding the core and having a radial thickness, $T_2$, and a minimum relative refractive index, $\Delta_{2MIN}$, of about 0.0% at a wavelength of $\lambda_0$, an intermediate clad layer surrounding the inner clad layer and having a radial thickness, $T_3$, and a maximum relative refractive index $\Delta_{3MAX}$ and an outer clad layer surrounding the inner clad layer and having a radial thickness, $T_4$, and a maximum relative refractive index, $\Delta_{4MIN}$, at a wavelength of $\lambda_0$. The optical fiber satisfies the following relationship: $\Delta_{1MAX} > \Delta_{3MAX} > \Delta_{2MIN}$, and the optical fiber exhibits an overfilled bandwidth of greater than or equal to about 1.5 GHz-km at $\lambda_0$.

The present disclosure extends to:
An optical fiber comprising:

a multimode core having a radius $R_1$, a relative refractive index $\Delta_1$, and a maximum relative refractive index $\Delta_{1MAX}$ at a wavelength $\lambda_0$; and an inner clad layer surrounding the multimode core, the inner clad layer having an outer radius $R_2$, a radial thickness $T_2=R_2-R_1$, a relative refractive index $\Delta_2$, and a minimum relative refractive index $\Delta_{2MIN}$ at a wavelength of $\lambda_0$; and an intermediate clad layer surrounding the inner clad layer, the intermediate clad layer having an outer radius $R_3$, a radial thickness $T_3=R_3-R_2$, a relative refractive index $\Delta_3$, and a maximum relative refractive index $\Delta_{3MAX}$ at a wavelength $\lambda_0$; and wherein $R_3$ is between 30 microns and 50 microns, $T_3$ is between 2 microns and 20 microns, $\Delta_{3MAX}$ is between 0.2% and 0.6%, $\Delta_{1MAX} > \Delta_{3MAX} > \Delta_{2MIN}$, and wherein the optical fiber exhibits an overfilled bandwidth of greater than or equal to about 2.5 GHz-km at a wavelength of $\lambda_0$.

Additional features and advantages of embodiments will be set forth in the detailed description which follows, and in part will be readily apparent to those skilled in the art from that description or recognized by practicing embodiments as described herein, including the detailed description which follows, the claims, as well as the appended drawings.

It is to be understood that both the foregoing general description and the following detailed description present embodiments, and are intended to provide an overview or framework for understanding the nature and character of embodiments as they are claimed. The accompanying drawings are included to provide a further understanding of embodiments, and are incorporated into and constitute a part of this specification. The drawings illustrate various embodiments, and together with the description serve to explain the principles and operations of embodiments.

DETAILED DESCRIPTION

Figure 1:
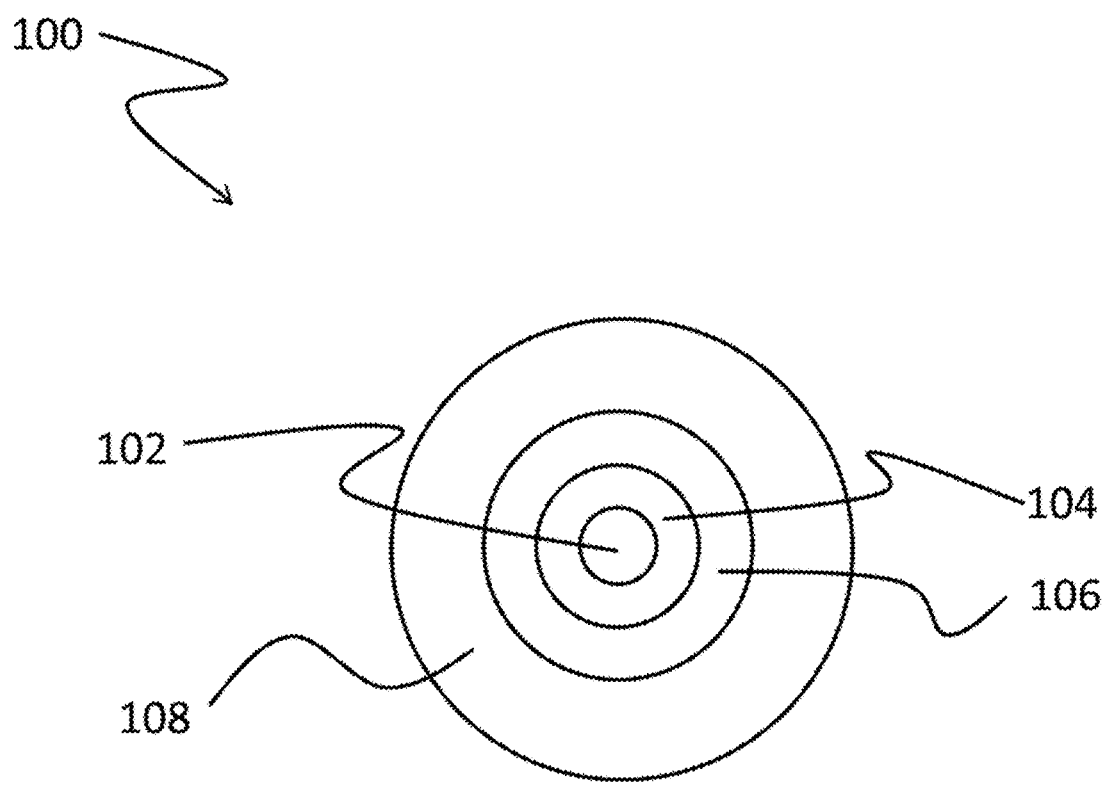
FIG. 1 is a schematic cross sectional view of an optical fiber according to one or more embodiments shown and described herein.

The "refractive index profile," as used herein, is the relationship between refractive index or relative refractive index and waveguide fiber radius.

"Relative refractive index," $\Delta_i$ %, of layer or layer i is defined as:

$$\Delta_i \% = 100 \times \frac{(n_i^2 - n_{ref}^2)}{2n_i^2}$$

where $n_i$ is the maximum refractive index in layer or layer i, unless otherwise specified, and $n_{ref}$ is the refractive index of pure silica glass, unless otherwise specified. Accordingly, as used herein, the relative refractive index percent is relative to pure silica glass.

It should be understood that the phrase "pure silica glass," as used herein, means that the layer or layer of optical fiber comprising "pure silica glass" does not contain material, such as dopants and/or other trace materials, in an amount which would significantly alter the refractive index of the silica glass layer or portion. However, small amounts of dopants (e.g., chlorine and/or fluorine in an amount less than 1500 ppm of each) may be present in the layer or portion that is otherwise "pure silica."

As used herein $\Delta_1$ refers to the relative refractive index of a core of the optical fiber, $\Delta_2$ refers to the relative refractive index of an inner clad layer of the optical fiber, $\Delta_3$ refers to the relative refractive index of an intermediate clad layer of the optical fiber, and $\Delta_4$ refers to the relative refractive index of an outer clad layer of the optical fiber. $\Delta_i$ of layer i may be constant or may vary with radial position within the layer. As used herein, $\Delta_{1MAX}$ refers to the maximum relative refractive index of a core of the optical fiber, $\Delta_{1MIN}$ refers to the minimum relative refractive index of a core of the optical fiber, $\Delta_{2MAX}$ refers to the maximum relative refractive index of an inner clad layer of the optical fiber, $\Delta_{2MIN}$ refers to the minimum relative refractive index of an inner clad layer of the optical fiber, $\Delta_{3MAX}$ refers to the maximum relative refractive index of an intermediate clad layer of the optical fiber, $\Delta_{3MIN}$ refers to the minimum relative refractive index of an intermediate clad layer of the optical fiber, $\Delta_{4MAX}$ refers to the maximum relative refractive index of an outer clad layer of the optical fiber, and $\Delta_{4MIN}$ refers to the minimum relative refractive index of an outer clad layer of the optical fiber. The relative refractive indexes are given in percentages.

The term "α-profile" or "alpha profile," as used herein, refers to a relative refractive index profile, expressed in terms of $\Delta$ which is in units of "%", where r is the radius and which follows the equation, $$\Delta = \Delta_{1max}\left[1 - \left(\frac{R}{R_1}\right)^\alpha\right],$$

where $\Delta_{1max}$ is the maximum relative refractive index, $R_1$ is the radius of the core, R is in the range $R_i \leq R \leq R_f$, $\Delta$ is the relative refractive index as defined above, $R_i$ is the initial point of the α-profile, $R_f$ is the final point of the α-profile, and α is an exponent which is a real number. For a step index profile, the alpha value is greater than or equal to 10. For a graded index profile, the alpha value is less than 10. The term "parabolic," as used herein, includes substantially parabolic shaped refractive index profiles which may vary slightly from an α value of 2.0 at one or more points in the core, as well as profiles with minor variations and/or a centerline dip.

The bend resistance or bend performance of an optical fiber may be measured by the induced attenuation of light propagating through the fiber under prescribed test conditions. As used herein, the 15 mm and the 30 mm macrobend tests for measuring the bend performance of an optical fiber consist of wrapping the fiber twice (two times) around a 15 mm and a 30 mm mandrel, respectively, and calculating the induced attenuation (i.e. the increase in attenuation) caused by wrapping the fiber around the mandrel (relative to the unwrapped state of the fiber).

Unless otherwise specified herein, measurements of the properties of the optical fiber are taken at a wavelength, $\lambda_0$, of 850 nm.

FIG. 1 schematically shows a cross section of an optical fiber according to one or more embodiments shown and described herein. Embodiments of optical fibers described herein generally comprise a glass portion comprising a core and a cladding disposed on the core. The cladding includes an inner clad layer surrounded by an intermediate clad layer surrounded by an outer clad layer. In some embodiments, the inner clad layer is an extension of the core. In other embodiments, the inner clad layer is a distinct layer from the core. The glass portion of the fiber may be surrounded by one or more coatings (not shown). The one or more coatings may include a lower modulus primary coating surrounded by a higher modulus secondary coating. The structure and composition of the optical fibers as well as the properties of the optical fibers will be described and discussed in more detail herein.

Referring to FIG. 1, a cross section of the glass portion of an optical fiber and the corresponding refractive index profile for the optical fiber are shown according to embodiments described herein. The glass portion 100 of an optical fiber generally comprises a core 102, an inner clad layer 104 surrounding the core 102, an intermediate clad layer 106 surrounding inner clad layer 104, and an outer clad layer 108 surrounding the intermediate clad layer 106. In embodiments, the core 102, the inner clad layer 104, the intermediate clad layer 106, and the outer clad layer 108 generally comprise silica glass or a silica-based glass. Silica-based glasses include doped variations of pure silica glass. The cross section of the glass portion 100 of an optical fiber may be generally circular-symmetric with respect to the center of the core 102 and the core 102 may have a radius $R_1$. The inner clad layer 104 may surround the core 102 and extend from the radius $R_1$ to the radius $R_2$ such that the inner clad layer has a radial thickness $T_2 = R_2 - R_1$. $R_2$ and $R_1$ correspond to the outer and inner radii, respectively, of inner clad layer 104. The intermediate clad layer 106 may surround the inner clad layer 104 and extend from the radius $R_2$ to the radius $R_3$ such that the intermediate clad layer has a radial thickness $T_3 = R_3 - R_2$. $R_3$ and $R_2$ correspond to the outer and inner radii, respectively, of intermediate clad layer 106. The outer clad layer 108 may surround the intermediate clad layer 106 and extend from the radius $R_3$ to the radius $R_4$ ($R_4$ is the outer radius of the glass portion of the optical fiber) such that the outer clad layer has a radial thickness $T_4 = R_4 - R_3$. $R_4$ and $R_3$ correspond to the outer and inner radii, respectively, of outer clad layer 108. Accordingly, the glass portion of the optical fiber (e.g., the core 102, inner clad layer 104, intermediate clad layer 106, and outer clad layer 108) may have an outer diameter $2R_4$.

As described herein, the core 102 has a radius $R_1$. In embodiments, the optical fiber with core layer 102 may be a multi-mode optical fiber. Accordingly, in some embodiments, the radius $R_1$ may be from greater than or equal to about 20 microns to less than or equal to about 30 microns, such as from greater than or equal to about 22 microns to less than or equal to about 28 microns. In other embodiments, the radius $R_1$ may be from greater than or equal to about 25 microns to less than or equal to about 27 microns. However, it will be understood that the core 102 may have different dimensions to facilitate various other multi-mode embodiments.

In some embodiments, the core 102 comprises silica glass ($SiO_2$) and one or more dopants that increase the index of refraction relative to the index of refraction of undoped silica glass. Dopants that increase the index of refraction of silica glass are referred to hereinafter as "up dopants". Updopants include, for example, $GeO_2$, $Al_2O_3$, $P_2O_5$, $TiO_2$, $ZrO_2$, $Nb_2O_5$ and/or $Ta_2O_5$. In some embodiments, the core 102 is updoped with $GeO_2$. For example, in some embodiments, the core is updoped with from greater than or equal to about 14.0 weight % to less than or equal to about 25.5 weight % $GeO_2$. Accordingly, in embodiments, the core 102 may comprise from greater than or equal to about 16.0 weight % to less than or equal to about 23.5 weight % $GeO_2$, or from greater than or equal to about 18.0 weight % to less than or equal to about 21.5 weight % $GeO_2$. Accordingly, when the core 102 is updoped with an updopant, such as, for example $GeO_2$, the maximum relative refractive index $\Delta_{1MAX}$ of the core 102 may be from greater than or equal to about 1.00% to less than or equal to about 1.70%, such as from greater than or equal to about 1.10% to less than or equal to about 1.60%. In other embodiments, the maximum relative refractive index $\Delta_{1MAX}$ of the core 102 may be from greater than or equal to about 1.20% to less than or equal to about 1.50%.

Figure 2:
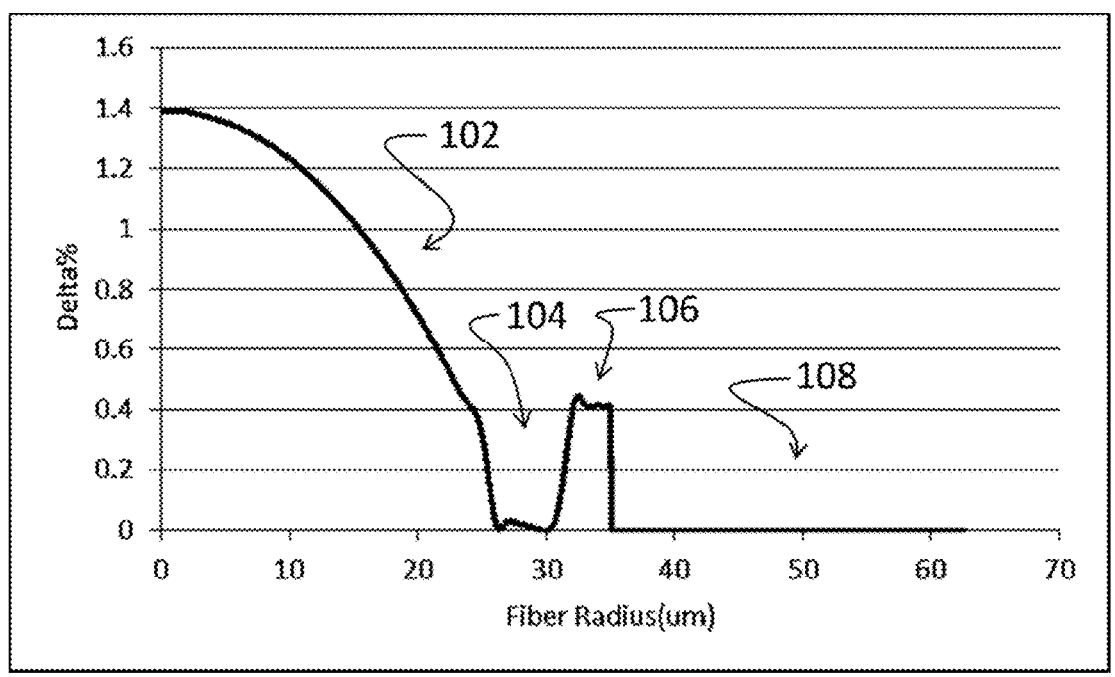
FIG. 2 graphically depicts a relative refractive index profile of an optical fiber according to one embodiment shown and described herein.
Figure 3:
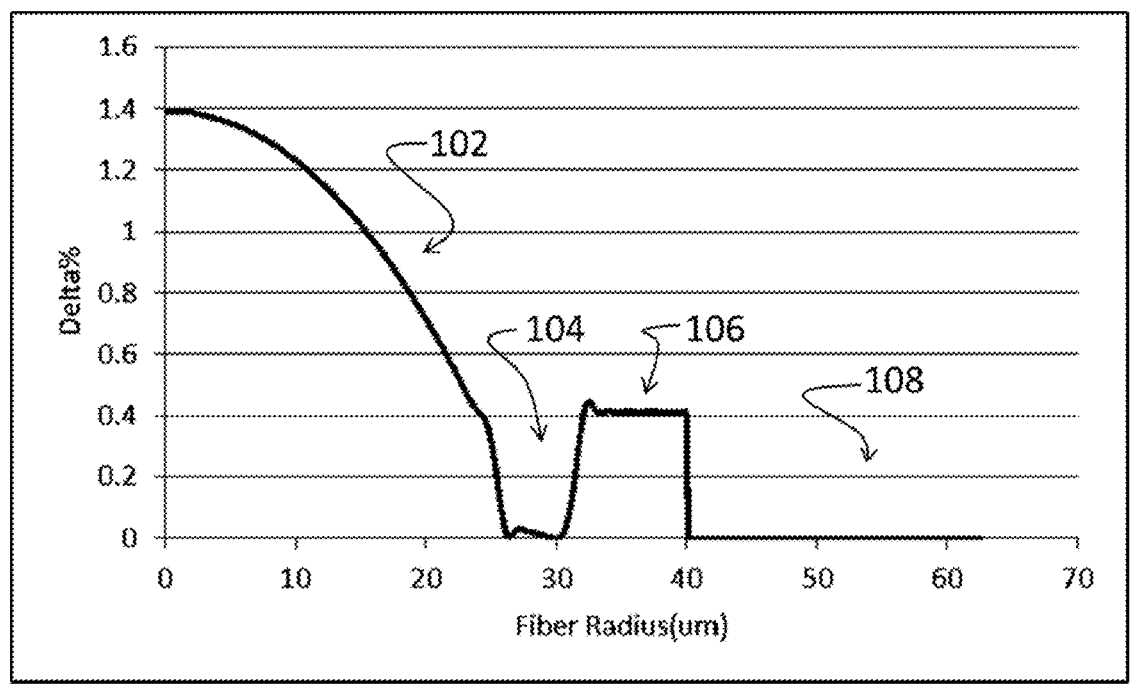
FIG. 3 graphically depicts a relative refractive index profile of an optical fiber according to another embodiment shown and described herein.
Figure 4:
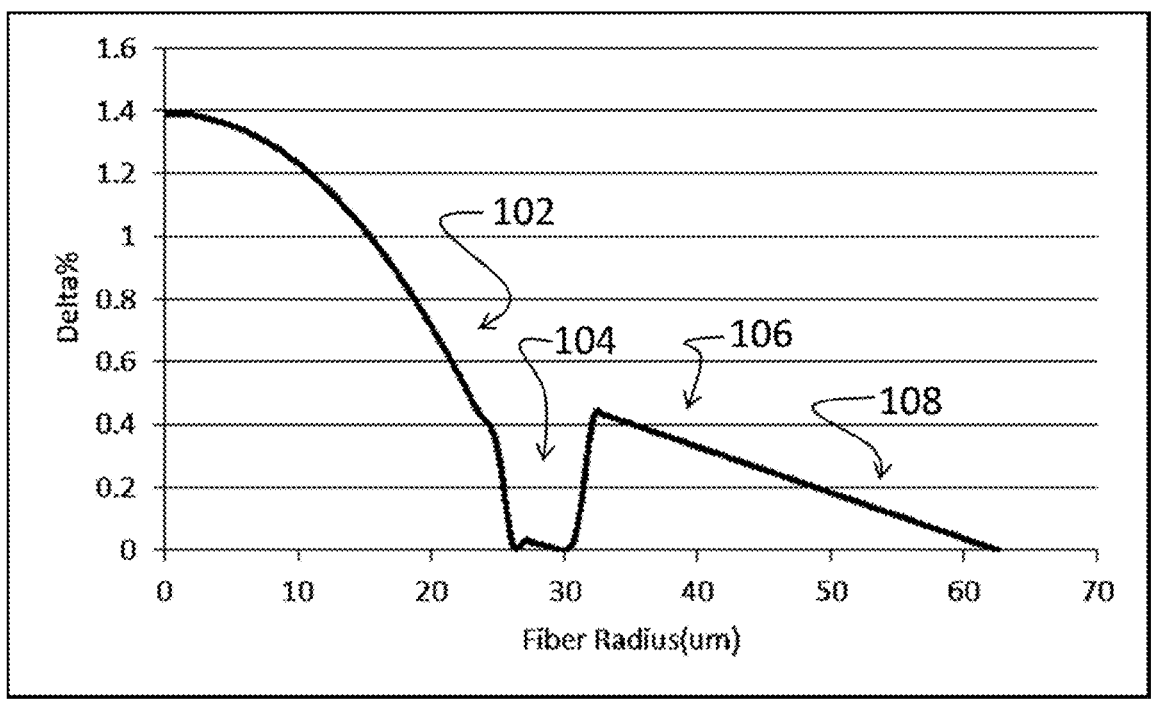
FIG. 4 graphically depicts a relative refractive index profile of an optical fiber according to another embodiment shown and described herein.

As described above, the core 102 has an alpha profile that describes the profile of the core 102, such as the profile shown in the refractive index profile of, for example, FIGS. 2-4. In embodiments, α may be from greater than or equal to about 1.95 to less than or equal to about 2.20, such as from greater than or equal to about 2.00 to less than or equal to about 2.15. In some embodiments, α may be about 2.12. When measured utilizing light having a wavelength of about 1060 nm, α of the core may be about 2.06, and when measured utilizing light having a wavelength of about 1300 nm, a of the core may be about 2.02.

As described herein, the inner clad layer 104 has a radial thickness $T_2=R_2-R_1$. The radial thickness $T_2$ of the of the inner clad layer 104 may depend on the desired dimensions of the core 102 and the desired dimensions and bend properties of the glass portion 100 of the optical fiber. In embodiments, the inner clad layer may have a radial thickness of greater than or equal to about 4.0 microns, such as greater than or equal to about 6.0 microns, or greater than or equal to about 8.0 microns. In other embodiments, the inner clad layer may have a radial thickness of greater than or equal to about 10.0 microns, such as greater than or equal to about 12.0 microns. In embodiments, the inner clad layer may have a radial thickness of less than or equal to about 15.0 microns, such as less than or equal to about 20.0 microns. The inner clad layer may have a radial thickness in the range from 4.0 microns to 20.0 microns, or in the range from 5.0 microns to 15.0 microns, or in the range from 6.0 microns to 20.0 microns.

The outer radius $R_2$ of inner clad layer 104 may be at least 20 microns, or at least 25 microns, or at least 30 microns, or at least 35 microns, or between 20 microns and 40 microns, or between 25 microns and 35 microns.

According to embodiments, the inner clad layer 104 may comprise pure silica glass ($SiO_2$), which has a minimum refractive index, $\Delta_{2MIN}$, of 0.0% or about 0.0%. In other embodiments, $\Delta_{2MIN}$ is between −0.50% and 0.50%, or between −0.25% and 0.25%, or between −0.10% and 0.10%, or between −0.05% and 0.05%. Accordingly, the inner clad layer may be essentially free of dopants, such as, for example, fluorine or chlorine, or only lightly doped with an updopant or downdopant. For example, in one embodiment, the inner clad layer is pure silica glass as shown in the exemplary refractive index profiles depicted in FIGS. 2-4. In embodiments, $\Delta_2$ may be constant with a value $\Delta_{2MIN}$. In embodiments, the composition of the inner clad layer 104 and the composition of the core 102 may be such that the difference ($\Delta_{1MAX}-\Delta_{2MIN}$) between $\Delta_{1MAX}$ and $\Delta_{2MIN}$ may be greater than or equal to about 0.9%, such as greater than or equal to about 0.95%. In some embodiments, the difference between $\Delta_{1MAX}$ and $\Delta_{2MIN}$ may be less than or equal to about 1.40%, such as less than or equal to about 1.30%.

In embodiments, the radial thickness of the inner clad layer 104 may be interrelated with the value of $\Delta_{3MAX}$. More specifically, the inner clad layer 104 may have a volume profile $V_2$ such that:

$$V_2 = 2\int_{R_1}^{R_2}(\Delta_{3MAX}-\Delta_{2MIN})rdr,$$

When $\Delta_{2MIN}=0$, volume profile $V_2$ becomes $$V_2 = 2\int_{R_1}^{R_2}\Delta_{3MAX}rdr,$$

which may be rewritten as:

$$V_2=\Delta_{3MAX}(R_2^2-R_1^2).$$

The volume index $V_2$ of the inner clad layer 104 (also referred to herein as moat volume) is from greater than or equal to about 60.0%-microns$^2$ to less than or equal to about 220%-microns$^2$, such as from greater than or equal to about 90.0%-microns$^2$ to less than or equal to about 190.0% microns$^2$. In other embodiments, the volume index $V_2$ of the inner clad layer 104 is from greater than or equal to about 120.0%-microns$^2$ to less than or equal to about 160.0%-microns$^2$, such as from greater than or equal to about 140.0%-microns$^2$ to less than or equal to about 150.0%-microns$^2$.

In embodiments, the intermediate clad layer 106 comprises updoped silica glass. The updopant may be chlorine (Cl). Doping of silica with Cl increases the relative refractive index of silica approximately linearly with Cl doping concentration (Δ increases by approximately 0.10% for each 1 wt % Cl increases in Cl doping concentration). For example, the intermediate clad layer 106 may comprise from greater than or equal to about 0.5 weight % chlorine, such as from greater than or equal to about 0.5 weight % to less than or equal to about 2.5 weight % chlorine. In some embodiments, the intermediate clad layer 106 may comprise from greater than or equal to about 0.7 weight % to less than or equal to about 2.0 weight % chlorine, such as from greater than or equal to about 1.0 weight % to less than or equal to about 1.8 weight % chlorine. In embodiments, the intermediate clad layer 106 may be updoped with chlorine such that the maximum relative refractive index ($\Delta_{3MAX}$) of the intermediate clad layer 106 relative to pure silica glass is greater than or equal to about 0.10% to less than or equal to about 0.70%, or greater than or equal to about 20% to less than or equal to about 0.60%, or greater than or equal to about 0.30% to less than or equal to about 0.50%. In embodiments, $\Delta_3$ may be constant with a value of $\Delta_{3MAX}$. In some embodiments, the intermediate clad layer 106 may be updoped with chlorine such that the maximum relative refractive index ($\Delta_{3MAX}$) of the intermediate clad layer 106 relative to pure silica glass is greater than or equal to about 0.05% to less than or equal to about 0.5%.

The difference ($\Delta_{3MAX}-\Delta_{2MIN}$) between $\Delta_{3MAX}$ and $\Delta_{2MIN}$ may be greater than or equal to about 0.1%, or greater than or equal to about 0.2%, or greater than or equal to about 0.3%, or greater than or equal to about 0.4%, or between about 0.1% and 0.7%, or between about 0.2% and about 0.6%, or between about 0.3% and about 0.5%.

According to embodiments, the intermediate clad layer 106 has a radial thickness $T_3=R_3-R_2$. In embodiments, the radial thickness $T_3$ of the intermediate clad layer 106 may be greater than or equal to about 1.0 microns, or greater than or equal to about 2.5 microns, or greater than or equal to about 5.0 microns, or greater than or equal to about 7.5 microns, or greater than or equal to about 10.0 microns, or less than or equal to about 25 microns, or less than or equal to about 20 microns, or less than or equal to about 15 microns, or between about 1.0 microns and about 25 microns, or between about 2.0 microns and about 20 microns, or between about 5.0 microns and about 15 microns, or between about 7.0 microns and about 13.0 microns, or between about 8.0 microns and about 12.0 microns.

The outer radius $R_3$ of intermediate clad layer 106 may be greater than or equal to 30 microns, or greater than or equal to 35 microns, or greater than or equal to 40 microns, or greater than or equal to 45 microns, or between 30 microns and 50 microns, or between 35 microns and 45 microns.

In embodiments, the outer clad layer 108 comprises pure silica glass. In other embodiments, the outer clad layer 108 comprises updoped or downdoped silica glass. The outer clad layer may be free of updopants (e.g. Cl) or downdopants (e.g. F), or may be lightly doped with an updopant or downdopant. The outer clad layer 108 may have a minimum relative refractive index $\Delta_{4MIN}$ of 0.0% or about 0.0%, or between −0.50% and 0.50%, or between −0.25% and 0.25%, or between −0.10% and 0.10%, or between −0.05% and 0.05%. In embodiments, $\Delta_{4MIN}=\Delta_{2MIN}$, or $\Delta_{4MIN}>\Delta_{2MIN}$, or $\Delta_{4MIN}<\Delta_{2MIN}$. In embodiments, $\Delta_4$ may be constant with a value of $\Delta_{4MIN}$. The difference ($\Delta_{3MAX}-\Delta_{4MIN}$) between $\Delta_{3MAX}$ and $\Delta_{4MIN}$ may be greater than or equal to about 0.1%, or greater than or equal to about 0.2%, or greater than or equal to about 0.3%, or greater than or equal to about 0.4%, or between about 0.1% and about 0.7%, or between about 0.2% and about 0.6%, or between 0.3% and about 0.5%. The difference ($\Delta_{2MIN}-\Delta_{4MIN}$) between $\Delta_{2MIN}$ and $\Delta_{4MIN}$ may be between about −0.3% and about 0.3%, or between about −0.2% and about 0.2%, or between −0.1% and about 0.1%.

According to embodiments, the outer clad layer 108 has a radial thickness $T_4=R_4-R_3$. In embodiments, $R_4$ may be at least about 50 microns, or at least about 55 microns or at least about 60 microns or at least about 65 microns, or about 62.5 microns, or between about 55 microns and about 65 microns. In embodiments, the radial thickness $T_4$ of the outer clad layer 108 may be greater than or equal to about 20 microns, or greater than or equal to about 25 microns, or greater than or equal to about 30 microns, or greater than or equal to about 35 microns, or less than or equal to about 40 microns, or less than or equal to about 35 microns, or less than or equal to about 30 microns, or between about 20 microns and about 45 microns, or between 20 microns and about 40 microns, or between about 20 microns and about 35 microns, or between about 25 microns and about 40 microns, or between about 25 microns and about 35 microns.

As described hereinabove, according to embodiments, the relative refractive indexes of the core 102, the inner clad layer 104, the intermediate clad layer 106, and the outer clad layer 108 satisfy one or more of the following relationships:

$\Delta_{1MAX}>\Delta_{3MAX}>\Delta_{2MIN}$, $\Delta_{1MAX}>\Delta_{3MAX}>\Delta_{4MIN}$,
$\Delta_{1MAX}>\Delta_{3MAX}>\Delta_{2MIN}>\Delta_{4MIN}$, and
$\Delta_{1MAX}>\Delta_{3MAX}>\Delta_{4MIN}>\Delta_{2MIN}$.

The relative refractive indexes described above for each of the core 102, the inner clad layer 104, the intermediate clad layer 106, and the outer clad layer 108 may be measured at a wavelength $\lambda_0$. In embodiments, $\lambda_0$ may be from greater than or equal to about 800 nm to less than or equal to about 1600 nm, such as from greater than or equal to about 840 nm to less than or equal to about 860 nm. In other embodiments, $\lambda_0$ may be from greater than or equal to about 960 nm to less than or equal to about 1000 nm, or from greater than or equal to about 1040 nm to less than or equal to about 1080 nm. In yet other embodiments, $\lambda_0$ may be from greater than or equal to about 1260 nm to less than or equal to about 1340 nm. In some other embodiments, $\lambda_0$ may be 850 nm or about 850 nm.

Optical fibers of embodiments disclosed herein, exhibit overfilled bandwidth of greater than or equal to about 1.5 GHz-km at $\lambda_0$. In some embodiments, the optical fiber exhibits an overfilled bandwidth that is greater than or equal to about 2.5 GHz-km at a wavelength of $\lambda_0$, such as greater than or equal to about 5.0 GHz-km at a wavelength of $\lambda_0$. In yet other embodiments, the optical fiber exhibits an overfilled bandwidth of greater than or equal to about 6.5 GHz-km at a wavelength of $\lambda_0$, such as greater than or equal to about 7.5 GHz-km at a wavelength of $\lambda_0$. The overfilled bandwidth is measured according to FOTP-204 using an overfilled launch.

According to embodiments, the optical fiber has a bend loss at a wavelength of 850 nm of less than or equal to about 0.2 dB when wound two turns around a mandrel having a diameter of 15 mm, such as less than or equal to about 0.1 dB when wound two turns around a mandrel having a diameter of 15 mm. In some embodiments, the optical fiber has a bend loss at 850 nm of less than or equal to about 0.05 dB when wound two turns around a mandrel having a diameter of 30 mm.

In some embodiments, the optical fiber has a numerical aperture (NA) greater than or equal to about 0.15, such as greater than or equal to about 0.20. In other embodiments, the optical fiber has a numerical aperture greater than or equal to about 0.25, such as greater than or equal to about 0.30. In still other embodiments, the optical fiber has a numerical aperture greater than 0.185 and less than 0.215. The numerical aperture is defined and measured in accordance with IEC 60793-1-43 (IEC 60793-1-43, Optical fibers. Part 1-43: Measurement methods and test procedures. Numerical aperture).

In certain embodiments, the core 102, inner clad layer 104, the intermediate clad layer 106, and the outer clad layer 108 may be formed by an outside-vapor-deposition (OVD) process. The OVD process is a way of making the glass portion of an optical fiber through reactions from the desired vapor ingredients (including silica and the other desired up dopant precursors) via a hydrolysis process in a $CH_4+O_2$ flame to form soot-particles. The soot-particles are then collected by thermophoretic means onto either a bait rod (for making a core soot-preform) or a glass core cane or rod (for making overclad soot-preform). The soot-preform is subsequently dried and densified into solid transparent glass in a high temperature furnace (after the bait rod is removed from the core preform), a process commonly referred to as consolidation. The desired core and cladding compositions are achieved by utilizing different amounts of various vapor-phase ingredients for each of the layers in the soot preform fabrication process. For example, the core/inner clad/clad perform may be generated first, then consolidated, and the final (consolidated) preform drawn into the glass portion of an optical fiber by known fiber-drawing methods.

More specifically, vapor-precursor-materials that may be used to make the portion of the soot preform associated with the fiber core are, for example, $SiCl_4$, $GeCl_4$, $AlCl_3$, $TiCl_4$, or $POCl_3$. As described herein, the core may comprise $GeO_2$ doped silica glass. After the updoped $SiO_2$ soot is consolidated into the core preform, soot of pure $SiO_2$ or lightly doped $SiO_2$ may be deposited on the core preform to form a soot preform of the inner clad layer of the optical fiber, which is thereafter consolidated to fully densified glass. Consolidation may optionally occur in the presence of a doping precursor to incorporate a dopant in the inner clad layer. The consolidated preform then may be placed and heated in an air, nitrogen or argon purged furnace at about 800-1200° C. to outgas the helium dissolved in the glass, and then optionally placed into another furnace and redrawn into one or multiple canes (also referred to as core canes) having a parabolic refractive index doped core surrounded by a silica cladding, that is core canes having a core/inner cladding.

After the core/inner clad preform or core canes are formed, updoped $SiO_2$ is deposited on the consolidated core/inner cladding preform/core cane to form a soot preform of the intermediate clad layer portion. The soot preform according to this embodiment may be consolidated in a furnace. The exemplary silica soot preform may be first dried at around 850° C.-1200° C. for 45-120 minutes in a furnace comprising chlorine and optionally helium. The preform is then heated to 1100 to about 1500° C. for doping with chlorine or other updopant and sintered to fully densified glass. Chlorine doping precursors include $Cl_2$ and/or $SiCl_4$.

After the core/inner clad/intermediate clad preform or core canes are formed, pure $SiO_2$ or lightly doped $SiO_2$ is deposited on the consolidated core/inner clad/intermediate clad preform/core cane to form a soot preform of the outer clad layer portion. The soot preform according to this embodiment may be consolidated in a furnace. Consolidation may occur in the presence of a doping precursor to introduce a dopant into the outer clad layer. The exemplary silica soot preform may be first dried at around 850° C.-1200° C. for 45-120 minutes in a furnace comprising chlorine and optionally helium. The preform is then heated to 1100 to about 1500° C. for chlorine doping and sintering to fully densified glass. After the drying and consolidation processes, the fully densified preform is cooled down and/or heated in an air, nitrogen or argon purged furnace at about 800-1200° C. to outgas the helium dissolved in the glass, thus making a glass optical preform having core, inner clad, intermediate clad, and outer clad regions. The preform is then taken to fiber draw. Thus by this process a high bandwidth multimode optical preform is made.

The optical fiber formed from the glass portion described herein comprising an updoped intermediate clad layer 106 may be applied to improve the bend performance of conventional fibers or enable new specialty fibers. In addition, using an inner clad layer of pure silica, which is essentially free of fluorine, in combination with an intermediate clad layer that is updoped allows the fiber to be formed in a simpler manufacturing process, which reduces production costs, production time, and hazards when compared to an optical fiber that has an inner clad layer doped with down dopant, such as fluorine.

EXAMPLES

Embodiments will be further clarified by the following examples.

FIGS. 2-4 show relative refractive index profiles of illustrative embodiments of optical fibers described herein. Each of the relative refractive index profile shown in FIG. 204 include core 102, inner clad layer 104, intermediate clad layer 106 and outer clad layer 108. Core 102 has a radial thickness of approximately 26 μm, a maximum relative refractive index $\Delta_{1MAX}$ approximately equal to 1.4, and a graded index profile corresponding to an α-profile with α=2.0 in each of FIGS. 2-4. Inner clad layer 104 has a radial thickness of approximately 4 μm and an approximately constant relative refractive index $\Delta_2$ approximately equal to 0% in each of FIGS. 2-4.

In FIG. 2, intermediate clad layer 106 has a radial thickness of approximately 5 μm and an approximately constant relative refractive index $\Delta_3$ having an approximate value of 0.4%. In FIG. 2, outer clad layer 108 has a radial thickness of approximately 27.5 μm and an approximately constant relative refractive index $\Delta_4$ having an approximate value of 0%.

In FIG. 3, intermediate clad layer 106 has a radial thickness of approximately 10 μm and an approximately constant relative refractive index $\Delta_3$ having an approximate value of 0.4%. In FIG. 3, outer clad layer 108 has a radial thickness of approximately 22.5 μm and an approximately constant relative refractive index $\Delta_4$ having an approximate value of 0%.

In FIG. 4, intermediate clad layer 106 and outer clad layer 108 have non-constant, sloping relative refractive indices $\Delta_3$ and $\Delta_4$, respectively. Intermediate clad layer 106 has a maximum relative refractive index $\Delta_{3MAX}$ with an approximate value slightly greater than 0.4%. Outer clad layer 108 has a minimum relative refractive index $\Delta_{4MIN}$ with an approximate value of 0% at a radial position $R_4$ with an approximate value of 62.5 μm. The transition from intermediate clad layer 106 to outer clad layer 108 is continuous and may be regarded as occurring at a radial position $R_3$ located halfway between the radial positions corresponding to $\Delta_{3MAX}$ and $\Delta_{4MIN}$.

Figure 5:
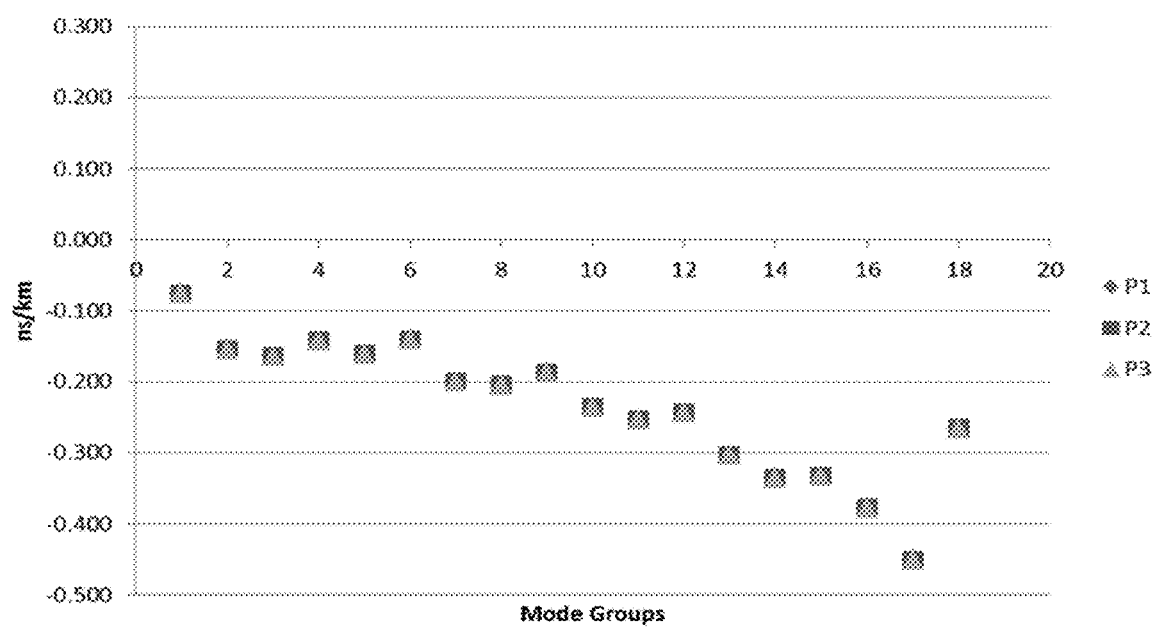
FIG. 5 graphically depicts delay for several mode groups in an optical fiber according to certain embodiments shown and described herein.
Figure 6:
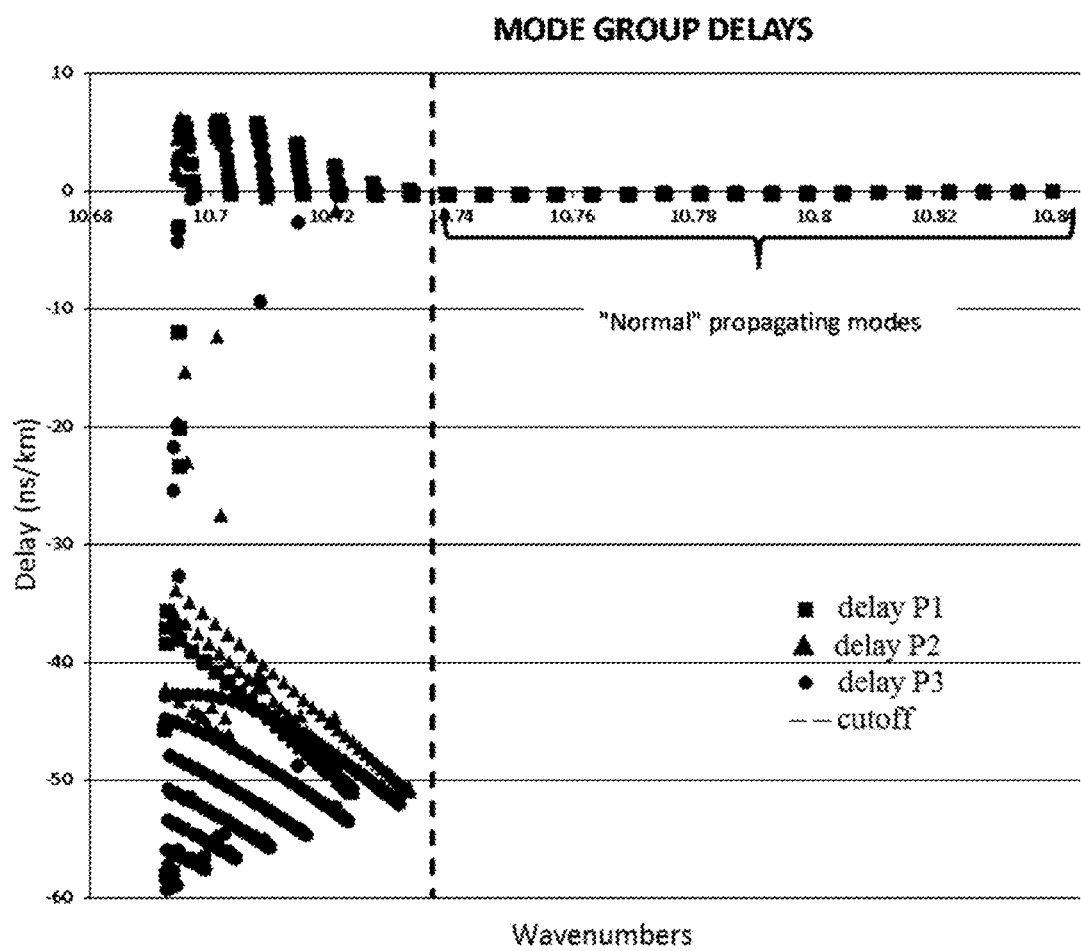
FIG. 6 graphically depicts mode group delay as a function of mode energy in an optical fiber according to certain embodiments shown and described herein.
Figure 7:
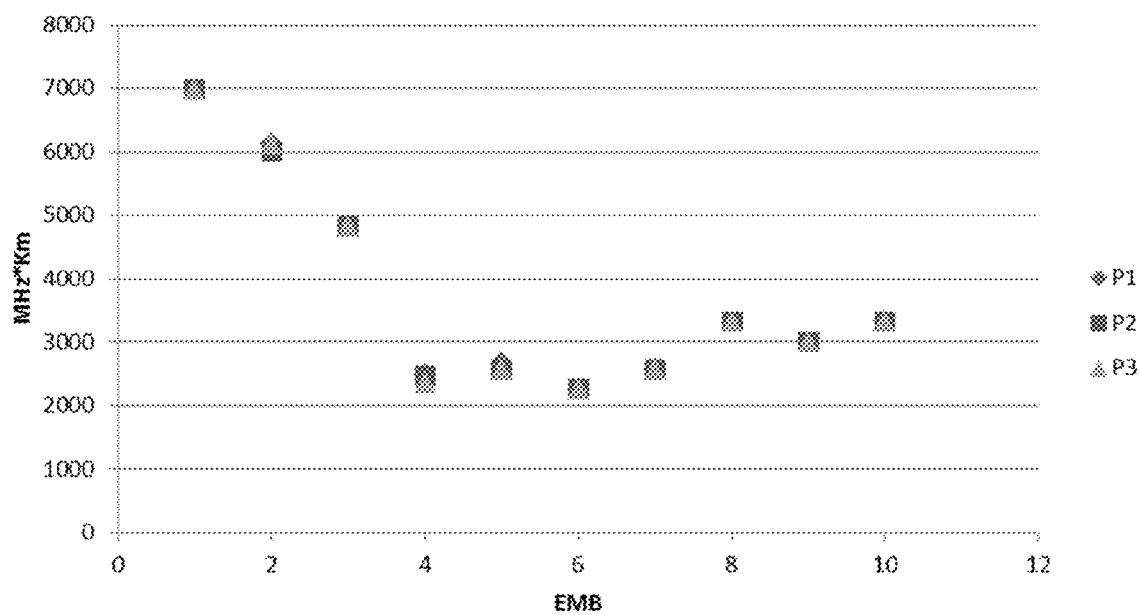
FIG. 7 graphically depicts bandwidth of optical fibers having relative refractive index profiles according to embodiments shown and described herein.

Selected optical parameters have been modeled for the relative refractive index profiles shown in FIGS. 2-4. The results are shown in FIGS. 5-7. In FIGS. 5-7, P1 refers to the relative refractive index profile shown in FIG. 2, P2 refers to the relative refractive index profile shown in FIG. 3, and P4 refers to the relative refractive index profile shown in FIG. 4. Numerical values for the data shown in FIGS. 5 and 7 are summarized in Tables 1 and 2 below. Table 3 shows the modeled bend loss at a wavelength of 850 nm for each profile when wrapped twice (two turns) around mandrels having diameters of 15 mm and 30 mm.

TABLE 1

| Mode Group Delays (ns/km) | | | |
| --- | --- | --- | --- |
| Mode Group | P1 | P2 | P3 |
| MG1 | −0.076 | −0.076 | −0.076 |
| MG2 | −0.156 | −0.156 | −0.156 |
| MG3 | −0.165 | −0.165 | −0.165 |
| MG4 | −0.143 | −0.143 | −0.143 |
| MG5 | −0.161 | −0.161 | −0.161 |
| MG6 | −0.142 | −0.142 | −0.142 |
| MG7 | −0.201 | −0.201 | −0.201 |
| MG8 | −0.205 | −0.205 | −0.205 |
| MG9 | −0.188 | −0.188 | −0.188 |
| MG10 | −0.236 | −0.236 | −0.236 |
| MG11 | −0.253 | −0.253 | −0.253 |
| MG12 | −0.244 | −0.244 | −0.244 |
| MG13 | −0.304 | −0.304 | −0.304 |
| MG14 | −0.336 | −0.336 | −0.336 |
| MG15 | −0.334 | −0.334 | −0.334 |
| MG16 | −0.378 | −0.378 | −0.378 |
| MG17 | −0.451 | −0.451 | −0.451 |
| MG18 | −0.266 | −0.266 | −0.266 |

TABLE 2

Modal Bandwidths (MHz-km)

| | P1 | P2 | P3 |
|---|---|---|---|
| EMB1 | 6982 | 6982 | 6982 |
| EMB2 | 6123 | 6016 | 6123 |
| EMB3 | 4834 | 4834 | 4834 |
| EMB4 | 2471 | 2471 | 2363 |
| EMB5 | 2686 | 2578 | 2578 |
| EMB6 | 2256 | 2256 | 2256 |
| EMB7 | 2578 | 2578 | 2578 |
| EMB8 | 3330 | 3330 | 3330 |
| EMB9 | 3008 | 3008 | 3008 |
| EMB10 | 3330 | 3330 | 3330 |

TABLE 3

Bend Loss (dB) at 850 nm

| Mandrel Diameter | P1 | P2 | P3 |
|---|---|---|---|
| 15 mm | 0.09 | 0.08 | 0.08 |
| 30 mm | 0.04 | 0.03 | 0.03 |

Table 1 and FIG. 5 show mode group delay for mode groups 1-18 (MG1-MG18) for the relative refractive index profiles shown in FIGS. 2-4 (profiles P1-P3, respectively). The data indicate similar mode group delays for each of the three profiles. The mode group delays are comparable to those of a commercial multimode fiber having a downdoped (F-doped) trench.

FIG. 6 shows mode group delay as a function of wavenumber for profiles P1, P2, and P3. The vertical dashed line shows the cutoff.

Table 2 and FIG. 7 illustrate the calculated effective bandwidth (expressed in units of MHz-km) for each default source defined in IEC60793-2-10 (IEC60793-2-10, Optical fibers. Part 2-10: Product specifications—Sectional specification for category A1 multimode fibers). The models are based on a standard multi-mode glass optical fiber, such as Corning® ClearCurve® multimode fiber manufactured by Corning, Inc.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An optical fiber comprising:
a multimode core having a radius $R_1$, a relative refractive index $\Delta_1$, and a maximum relative refractive index $\Delta_{1MAX}$ at a wavelength $\lambda_0$; and
an inner clad layer surrounding the multimode core, the inner clad layer having an outer radius $R_2$, a radial thickness $T_2=R_2-R_1$, a relative refractive index $\Delta_2$, and a minimum relative refractive index $\Delta_{2MIN}$ at a wavelength of $\lambda_0$; and
an intermediate clad layer surrounding the inner clad layer, the intermediate clad layer having an outer radius $R_3$, a radial thickness $T_3=R_3-R_2$, a relative refractive index $\Delta_3$, and a maximum relative refractive index $\Delta_{3MAX}$ at a wavelength $\lambda_0$; and
wherein $R_3$ is between 30 microns and 50 microns, $T_3$ is between 2 microns and 20 microns, $\Delta_{3MAX}$ is between 0.2% and 0.6%, $\Delta_{1MAX} > \Delta_{3MAX} > \Delta_{2MIN}$, and
wherein the optical fiber exhibits an overfilled bandwidth of greater than or equal to about 2.5 GHz-km at a wavelength of $\lambda_0$.

2. The optical fiber of claim 1, wherein $R_1$ is between 20 microns and 30 microns.

3. The optical fiber of claim 1, wherein $\Delta_{1MAX}$ is between 1.0% and 1.7%.

4. The optical fiber of claim 1, wherein $R_2$ is greater than or equal to 20 microns and $T_2$ is between 4 microns and 25 microns.

5. The optical fiber of claim 1, wherein $\Delta_{2MIN}$ is between −0.10% and 0.10%.

6. The optical fiber of claim 1, wherein $\Delta_{2MIN}$ is about 0%.

7. The optical fiber of claim 1, wherein $R_3$ is between 30 microns and 45 microns.

8. The optical fiber of claim 1, wherein $T_3$ is between 5 microns and 15 microns.

9. The optical fiber of claim 1, wherein $\Delta_{3MAX}$ is between 0.3% and 0.5%.

10. The optical fiber of claim 1, wherein the difference $\Delta_{3MAX}-\Delta_{2MIN}$ is at least 0.2%.

11. The optical fiber of claim 1 wherein $\lambda_0$ is between 800 to 1600 nm.

12. The optical fiber of claim 1 wherein $\lambda_0$ is between 840 to 860 nm.

13. The optical fiber of claim 1 wherein $\lambda_0$ is between 960 to 1000 nm.

14. The optical fiber of claim 1 wherein $\lambda_0$ is between 1040 to 1080 nm.

15. The optical fiber of claim 1 wherein $\lambda_0$ is between 1260 to 1340 nm.

16. The optical fiber of claim 1, wherein the optical fiber exhibits an overfilled bandwidth of greater than or equal to about 5.0 GHz-km at a wavelength of $\lambda_0$.

17. The optical fiber of claim 1, wherein the optical fiber has a bend loss at 850 nm of less than or equal to about 0.2 dB when wound two turns on a mandrel having a diameter of about 15 mm.

18. The optical fiber of claim 1, further comprising an outer clad layer surrounding the intermediate clad layer, the outer clad layer having an outer radius $R_4$, a radial thickness $T_4=R_4-R_3$, a relative refractive index $\Delta_4$, and a minimum relative refractive index $\Delta_{4MIN}$ at a wavelength of $\lambda_0$.

19. The optical fiber of claim 18, wherein $T_4$ is between 20 microns and 40 microns.

20. The optical fiber of claim 18, wherein $\Delta_{4MIN}$ is between −0.10% and 0.10%.

21. The optical fiber of claim 18, wherein the difference $\Delta_{4MIN}-\Delta_{2MIN}$ is between −0.2% and 0.2%.

22. The optical fiber of claim 18, wherein $\Delta_{4MIN}=\Delta_{2MIN}$.

* * * * *